March 31, 1936.  G. SAUER  2,035,986
ROTARY HOOK FOR SEWING MACHINES
Filed Nov. 30, 1934
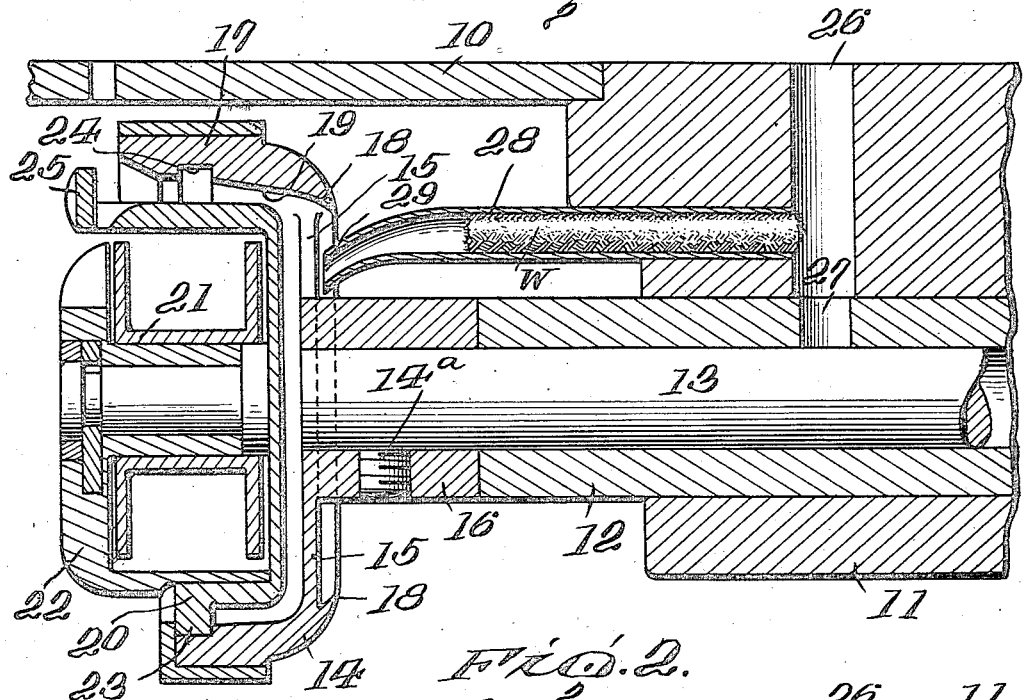
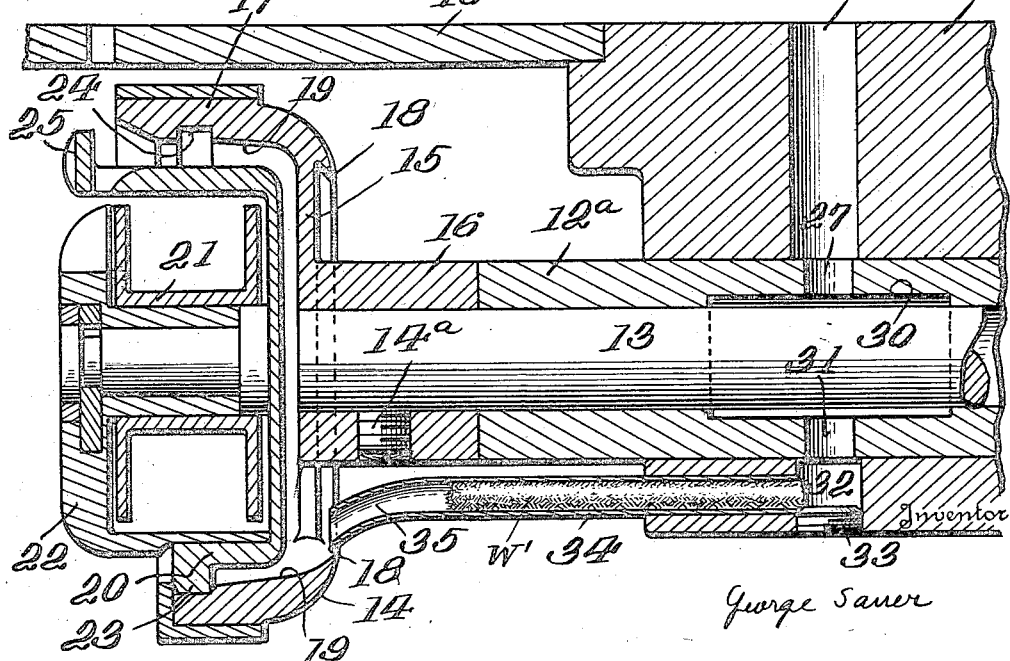
Inventor
George Sauer
By Sturtevant & Mason
Attorneys Patented Mar. 31, 1936

2,035,986

UNITED STATES PATENT OFFICE 2,035,986

ROTARY HOOK FOR SEWING MACHINES

George Sauer, Berwyn, Ill., assignor to Union Special Machine Company, Chicago, Ill., a corporation of Illinois Application November 30, 1934, Serial No. 755,496

6 Claims. (Cl. 112—256)

The present invention relates to new and useful improvements in a rotary hook for a lockstitch sewing machine and more particularly to improved means for furnishing lubricant to the interengaging parts between the rotary hook and the stationary bobbin casing.

An object of the invention is to provide stationary means located exteriorly of the operating shaft for the rotary hook for directing lubricant to the rotary hook from which lubricant is caused to flow to the interengaging parts between the rotary hook and the stationary bobbin casing by centrifugal force.

A further object of the invention is to provide a rotary hook having on the outer face thereof an overhanging flange and means independent of the rotary hook operating shaft for directing lubricant to the flange from which lubricant is caused to flow by centrifugal force to said interengaging parts.

The above and other objects of the invention will in part be obvious and will be hereinafter more fully pointed out.

In the accompanying drawing:

Figure 1 is a side elevation, in section, showing the assembled rotary hook and the lubricating means therefor.

Figure 2 is a side elevation, in section, showing the assembled rotary hook and another form of lubricating means therefor.

The invention relates generally to means for furnishing lubricant to the interengaging parts between the rotary hook and the stationary bobbin casing. The rotary hook is fixed to the end of a rotating shaft and the bobbin casing is mounted within and supported by the rotary hook. The bobbin casing is provided with a circumferential rib which engages a groove or raceway in the hook and thus prevents lateral movement of the bobbin casing relative to the rotary hook. A portion of the bobbin casing engages a fixed part of the machine in order to prevent rotation of the casing within the rotary hook. The operating shaft for the rotary hook is supported in a bushing which is mounted in a bracket depending from the work support of the machine. An oil duct or conduit in the form of a tubular member is mounted in a depending bracket on the machine and means including an oil hole therein are provided for admitting lubricant to the tubular member. The tubular oil duct may be packed with absorbent material and the free end thereof is located adjacent the rear face of the rotary hook. The rotary hook is provided on the rear face thereof with a flange which overhangs the end of the oil tube and the oil issuing from the tube will find its way to the overhanging flange from which it will be caused to flow along the inclined inner face of the hook rim to the interengaging parts by centrifugal force whereby to lubricate the same.

Referring more in detail to Fig. 1 of the accompanying drawing, the invention is shown as applied to a sewing machine having a work support 10 which is provided with a depending bearing bracket 11 in which is mounted a bushing 12. The actuating shaft 13 is mounted within the bushing 12 and the rotary hook 14 is secured to the end thereof by a screw 14a. The particular manner in which the actuating shaft for the rotary hook is driven forms no part of the present invention and it is to be clearly understood that the shaft may be driven in any suitable manner. For purposes of illustration, however, the shaft 13 may be driven by suitable intermeshing gears, as shown in the copending application of George Sauer, Serial No. 688,512, filed September 7, 1933, and described in detail in the copending application of Norman V. Christensen et al., Serial No. 670,186, filed May 9, 1933. The shaft may also be driven in the manner shown and described in the copending applications of George Sauer, Serial Nos. 716,415 and 716,416, filed March 19, 1934.

The rotary hook 14 is of the usual cup-shaped construction with portions cut away to form spaced radial webs or spokes 15 which are formed as part of the hub 16 and which join the hub to the rim portion 17. The spokes or webs 15 are illustrated as being slightly inset with respect to the rear face of the hook and the rear edge 18 of the rim 17 is inclined toward the axis of the hook, thus providing an overhanging flange, so as to leave an inclined edge which merges into the inclined inner face 19 of the rim 17. One side wall of the cup is shaped to provide a hook which is adapted to enter the needle thread loop and carry the same about the bobbin casing 20 which is also cup-shaped and is adapted to receive a bobbin 21 therein. The bobbin is held within the bobbin casing by a cover or carrier 22. The bobin casing is provided with a circumferential rib 23 which fits within a groove or raceway 24 in the rim portion 17 of the rotary hook. The bobbin casing is provided with a projecting portion 25 which engages a fixed part of the sewing machine in order to prevent the rotation thereof. The rib 23 and raceway 24 form interengaging parts to prevent lateral movement of the bobbin casing in the rotary hook. The rotary hook operates in the usual manner and further description thereof is not considered necessary.

The depending bracket portion 11 is provided with an oil hole 26 which communicates with an opening 27 in the bushing 12 so that oil may pass therethrough to lubricate the actuating shaft 13. An oil tube or conduit 28 has one end thereof mounted in an opening in the bracket 11 above the bushing 12 and this opening communicates with the oil hole 26. The tube 28 may be filled with wicking or other absorbent material as at W. The free end of the tube terminates in a depending spout 29 which is disposed within the overhanging edge or flange 18 of the hook rim. Oil dropping from the spout 29 will be thrown by centrifugal force outwardly from the hub along the outer face of the webs 15 to the flange 18 which catches it and conducts it between the webs to the inclined inner face 19 of the hook rim 17 and in this manner the oil will be caused to flow to the interengaging parts between the hook and the bobbin casing, that is, to the rib 23 and raceway 24.

In Fig. 2, a slightly different form of device for conducting the oil to the rotary hook is shown, but the rotary hook assembly is exactly the same as shown in Fig. 1 so that further description thereof is not thought necessary. An oil hole 26 in the bearing bracket 11 communicates with an opening 27 in the bushing 12a. The opening 27 communicates with a recess 30 formed around the inner periphery of the bushing 12a. The bushing 12a is provided with an opening 31 beneath the shaft 13 and communicating with the recess 30 and this opening registers with an opening 32 in the bottom of the bearing bracket 11 which is closed and sealed by a screw 33. An oil tube 34 has one end thereof inserted in an opening in the bearing bracket beneath the shaft in communication with the opening 32. Oil admitted to the oil hole 26 in the bracket 11 will thus pass around the shaft 13 for lubrication thereof and flow into the tube 34 which may be filled with wicking or other suitable absorbent material as at W'. The free end of the tube 34 terminates in a depending spout 35 which is disposed adjacent the flange 18 on the hook rim 17. Oil dropping from the end 35 of the tube 34 will be deposited directly on the flange 18 from which it will be conducted by centrifugal force along the inclined inner face 19 of the hook rim 17 to the rib 23 and raceway 24.

From the foregoing description it will be seen that novel means for lubricating the interengaging parts between the rotary hook and the stationary bobbin casing is herewith provided. It will be noted that the device for conducting the lubricant from a source of supply to the rotary hook is stationary and does not rotate with the actuating shaft, thus simplifying the device and permitting lubricant to be conducted from a remote source of supply exteriorly of the actuating shaft to the rotary hook.

It is to be clearly understood that minor changes in the details of construction and arrangement of parts may be made without departing from the scope of the invention as set forth in the appended claims.

Having thus described the invention, what I claim as new and desire to secure by Letters Patent is:

1. In a sewing machine, the combination of a rotary hook having a hub and rim portion, a stationary bobbin casing supported within said hook, a shaft on which said hook is mounted, said rim portion and casing having interengaging parts to prevent relative lateral movement between said casing and said hook, and means including a stationary lubricant conduit extending substantially parallel to and spaced from said shaft and disposed exteriorly of said hub for directing lubricant from a source of supply to a point on said rotary hook within the rear edge of said rim portion.

2. In a sewing machine, the combination of a rotary hook having the rim portion thereof forming an overhanging flange at the rear edge thereof, a stationary bobbin casing supported within said hook, said casing and hook having interengaging parts to prevent relative lateral movement therebetween, and means for furnishing lubricant to said interengaging parts and including a stationary conduit for directing lubricant from a source of supply to a point on said rotary hook within said overhanging flange.

3. In a sewing machine, the combination of a rotary hook having an overhanging flange at the rear edge thereof, a stationary bobbin casing supported within said hook, said casing and hook having interengaging parts to prevent relative lateral movement therebetween, an actuating shaft for said hook, means including a depending bracket member for supporting said shaft, and means including a tubular oil conduit for furnishing oil to said interengaging parts, said conduit having one end thereof mounted in said bracket member and having the free end thereof disposed within said overhanging flange whereby to deliver oil to said hook.

4. In a sewing machine, the combination of a rotary hook having a hub, a rim portion and spokes connecting said rim portion and said hub, said rim portion having an inclined inner face and a flange at the rear edge thereof overhanging said spokes, of a stationary bobbin casing supported within said hook, said casing and rim portion having interengaging parts to prevent relative lateral movement between said casing and said hook, an oil tube mounted on a stationary part of the sewing machine, and means for furnishing oil thereto, said tube having the free end thereof disposed within said overhanging flange and directly over said hub whereby oil is delivered to said hub and then caused to flow by centrifugal force along the outer faces of said spokes to said overhanging flange and thence between adjacent spokes along the inner face of said rim to said interengaging parts.

5. In a sewing machine, the combination of a rotary hook having a hub, a rim portion and spokes connecting said rim portion and said hub, said rim portion having an inclined inner face and a flange at the rear edge thereof overhanging said spokes, of a stationary bobbin casing supported within said hook, said casing and rim portion having interengaging parts to prevent relative lateral movement between said casing and said hook, an oil tube mounted on a stationary part of the sewing machine, and means for furnishing oil thereto, said tube having the free end thereof disposed beneath said hub within said flange whereby oil is delivered to said flange and then caused to flow by centrifugal force between adjacent spokes along the inner face of said rim portion to said interengaging parts.

6. In a sewing machine, the combination of a rotary hook having an overhanging flange at the rear edge thereof, a stationary bobbin casing supported within said hook, said casing and hook having interengaging parts to prevent relative lateral movement therebetween, an actuating shaft for said hook, a bracket member adapted to support said shaft, means including a conduit member for furnishing lubricant to said inter-engaging parts, said conduit member having one end thereof mounted in said bracket member, and means for supplying lubricant to said conduit member, the opposite end of said conduit member terminating in a depending spout disposed within said overhanging flange whereby to deliver lubricant thereto and thence to said inter-engaging parts.

GEORGE SAUER.